United States Patent [19]

Zegray

[11] Patent Number: 5,511,411
[45] Date of Patent: Apr. 30, 1996

[54] OIL CONSUMPTION METER

[76] Inventor: John Zegray, R.R. #2, Marion Bridge, Nova Scotia, Canada, B0A 1P0

[21] Appl. No.: 306,738

[22] Filed: Sep. 15, 1994

Related U.S. Application Data

[63] Continuation of Ser. No. 76,211, Jun. 14, 1993, abandoned.

[30] Foreign Application Priority Data

Feb. 11, 1993 [CA] Canada ................................ 2089328

[51] Int. Cl.⁶ ............................................ G01F 1/00
[52] U.S. Cl. ............................................ 73/861
[58] Field of Search ........................ 73/113, 861, 198; 239/74

[56] References Cited

U.S. PATENT DOCUMENTS 2,296,540  9/1942  Schurz ........................ 73/198
3,156,290  11/1964  Goodall, Jr. et al. .............. 239/74
4,262,530  4/1981  Gerquest ..................... 73/861.08
5,270,684  12/1993  Faraci, Jr. ...................... 73/861

Primary Examiner—Robert Raevis
Attorney, Agent, or Firm—Marks & Clerk

[57] ABSTRACT

An oil consumption meter for an oil-burning furnace with a burner motor, comprises a user accessible memory for storing the rate of oil consumption of the furnace, a sensor means for generating a signal when the burner motor is in operation, a processor responsive to the sensor signal to calculate the oil consumption from the time said burner motor is in operation, and a display for displaying the oil consumption as calculated by the processor. The meter can be easily retrofitted by the homeowner without the need to be plumbed or wired into the furnace circuitry.

11 Claims, 2 Drawing Sheets

OIL CONSUMPTION METER

This application is a continuation of application Ser. No. 076,211, filed Jun. 14, 1993, now abandoned.

BACKGROUND OF THE INVENTION

This invention relates to an oil consumption meter for use with an oil-burning furnace.

Many homes in North America rely on an oil-burning furnace as the primary source of heat. The furnace is usually installed in the basement, and may be used, for example, to heat air that is delivered to the various parts of the house through a duct system by means of a blower associated with the furnace or water that is distributed through a radiator system.

Such furnaces are usually supplied by a large oil tank having an inlet pipe leading to the exterior. Most homeowners have a contract with an oil supplier, who fills up the tank at periodic intervals. Generally, the contractor estimates consumption from past data and environmental conditions The contractor then bills the homeowner in accordance with the reading shown on the meter mounted on the oil tanker.

Generally speaking, the homeowner has no means of verifying the tanker reading or monitoring oil consumption on an on-going basis. Oil tanks are not generally supplied with level meters, and such level meters are notoriously unreliable. It would be a tricky and messy task to retrofit such a meter, and furthermore the cross-sectional area of a standard oil tank is such that a small change in level can represent a significant quantity of fuel. It is therefore extremely difficult to provide an accurate indication of oil consumption by this means.

Various types of flow meter are known. In theory, such a flow meter could be mounted in the oil delivery system of the furnace, but such a meter would require invasion of the furnace system in order to be plumbed in. Such an operation is likely to be beyond the capability of the average homeowner, and furthermore such systems are generally expensive.

An object of the invention is to provide a low cost retrofittable device that the homeowner can use to monitor oil consumption without requiring invasion of the furnace system.

SUMMARY OF THE INVENTION

According to the present invention there is provided a retrofittable, non-invasive oil consumption meter for an oil-burning furnace having a burner motor, comprising a user accessible memory for storing the rate of oil consumption of the furnace; means for generating a signal when the burner motor is in operation; processor means responsive to said signal to calculate the oil consumption from the time said burner motor is in operation; and display means for displaying the oil consumption as calculated by said processor means.

The burner motor is necessary to drive the fuel pump to ensure a continuous flow of oil to the burner. The burner motor is therefore in operation whenever the burner is consuming oil.

In a preferred embodiment, the means for generating the signal indicating operation of the burner motor is a pick-up coil mountable on the motor casing. The pick-up coil responds to the changing magnetic fields and generates a signal when the burner motor is in use.

The meter can be made in the form of a simple retrofit, battery-operated device the requires no external wiring. The homeowner need merely tape the sensor onto the burner motor housing and locate the display in a convenient location. He then activates buttons on the front of the unit to set the flow rate of his particular furnace. Upon activation of the unit, it calculates oil consumption from the time of operation of the burner motor and the flow rate stored in memory and set by the user.

The invention takes advantage of the fact that furnaces burn oil at a known and constant rate. The low cost device therefore indicates the amount of oil consumption to the homeowner with a sufficient degree of accuracy for practical purposes.

The display is preferably in the form of an LCD display with membrane type setting buttons close by it. These setting buttons can be used to change the mode so as to indicate in liters, imperial or US units, and also, if desired, to indicate the actual time that the burner motor has been in operation.

While the sensor arrangement is preferred, instead of employing a sensor, the unit could be activated directly from the burner motor switch.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
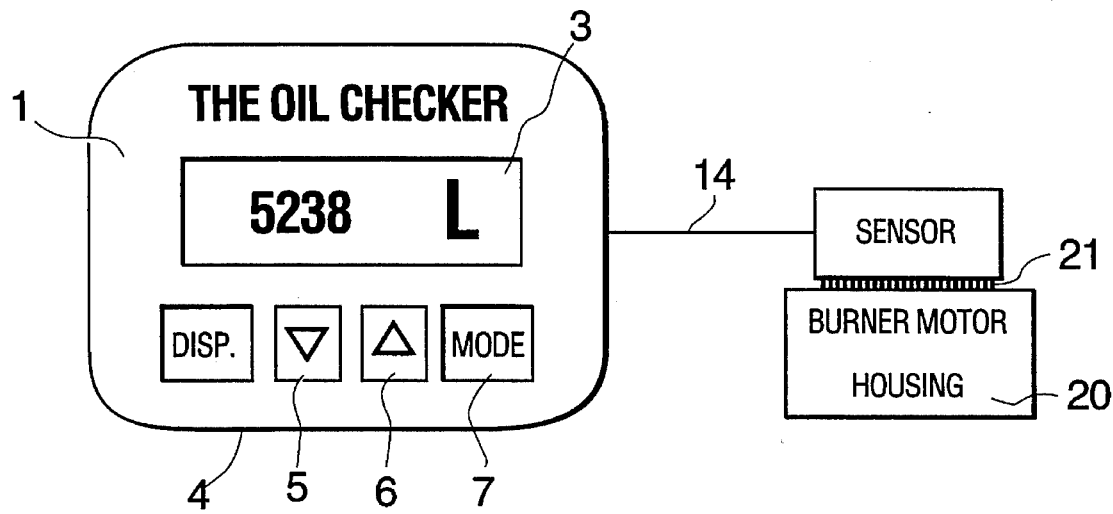
FIG. 1 is a front elevational view of an oil meter in accordance with one embodiment of the invention.

Referring now to FIG. 1, the oil meter comprises a main unit 1 adapted to be mounted in a convenient location connected by a wire to a sensor 2 adapted to be mounted on the housing 20 of a burner motor for a conventional domestic oil-burning furnace. The sensor can include adhesive pads 21 or other means of enabling it to be attached to the burner motor housing.

The unit 1 comprises a standard LCD display 3 and setting buttons 4, 5, 6 and 7.

The numerical part of the display 3 indicates the quantity of oil used, hours of operation of the burner motor, or flow rate according to the mode set by mode button 7. The alpha part of the display indicates the mode set by the mode button 7. In the illustration L indicates liters, but alternative displays are U for US gallons, I for imperial gallons, H for hours, and S for set flow rate. The buttons 4 through 7 are preferably membrane type touch buttons.

On depression of button 4, the display is activated and gives a ready reading in accordance with the current mode setting. As illustrated, this is the actual quantity of oil consumed since the last reset and L indicates that the quantity is being measured in liters.

When mode button 7 is toggled to the S mode, the flow rate can be set with the decrement and increment buttons 5, 6. The user uses the decrement and increment buttons 5, 6, to set the flow rate in accordance with the flow rate at which his furnace is set to operate.

Unit 1 is provided with a double sided tape or adhesive pad to permit it to be attached to the furnace or a nearby wall. It is connected by six feet of wire to the sensor 2, which can be mounted on the furnace motor in a similar manner. Sensor 2 comprises a pick-up coil responsive to the changing magnetic field's present burner motor operation.

The size of the unit 1 is approximately 3 inches wide by 1.5 inches high by 0.75 inches deep. To reset the display, the display and mode buttons are depressed simultaneously. This zeros the reading on the display unit 3.

The unit 1 is preferably battery driven, although it can be main powered if desired, and the display is blanked after about one minute to conserve battery life. This is especially important if an LED display is employed instead of an LCD display. An LED display may be preferable since the unit is likely to be located in a dark part of the house. After the display 3 has been activated, it normally remains active for about one minute after which it is again blanked.

Figure 2:
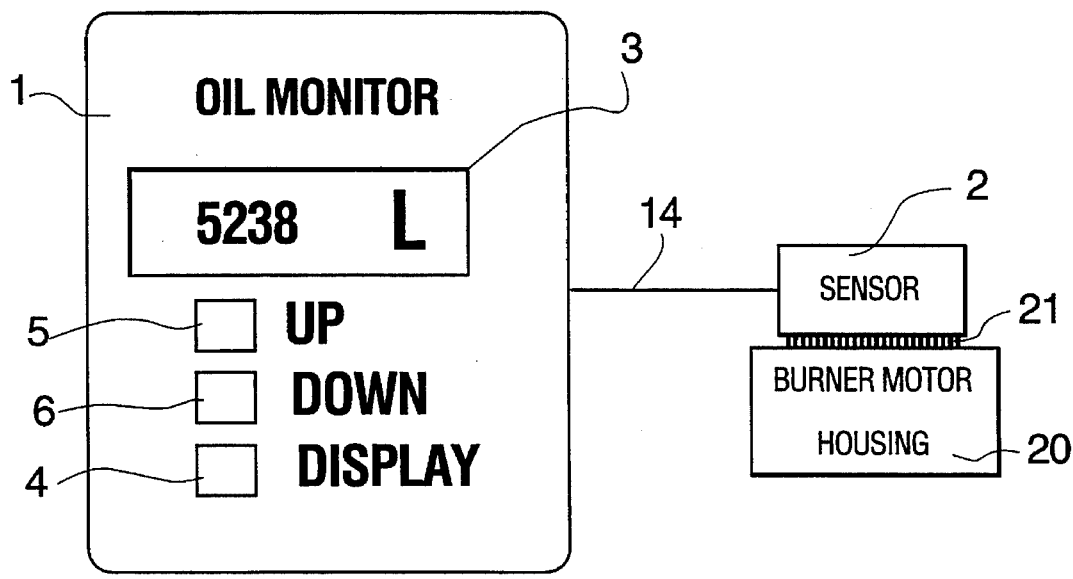
FIG. 2 is a front elevational view of an oil meter in accordance with a second embodiment of the invention.

The unit shown in FIG. 2 is a three-button device, which is more economical to manufacture. This only includes DISPLAY, UP, and DOWN buttons 4, 5, 6. The operation is as follows:

Firstly, to install the unit, the user turns up the furnace thermostat so that the furnace burner motor is operating. The user then slowly moves the sensor 2 along the side of the burner motor until the display 3 indicate "ON". The sensor 1 is attached to the motor housing in this location using a supplied plastic tie wrap. The user then turns down the furnace thermostat so that the burner motor is not operating and confirms that the display indicates "OFF".

Next the user presses the DISPLAY button on the front of the unit to enter the burner nozzle flow rate in US gallons per hour (USG/Hr). The display will initially show the default rate of "0.000" and the latter "F" will appear to the right of the display indicating FLOW. The first 0 digit will be flashing. If, for example, the burner flow rate is 0.054 USG/HR as shown on the burner motor name plate, the DISPLAY button is pressed once to step to the second digit and again to stop at the third digit. The third digit will be flashing. The UP button is pressed five times to increment the third digit to read "5". The display should show "0.0500". The DISPLAY button is pressed again and the last digit starts flashing. The UP button is pressed four times until the last digit reads "4". The Display then shows "0.054".

If a mistake is found after a digit has been entered, the DISPLAY button can be pressed a few times until the erroneous digit is flashing.

When the display indicates the correct flow rate, the DISPLAY button is pressed until the "F" on the right side of the display is flashing and then the UP button is pressed.

The unit is attached to the side of the furnace or a nearby wall at approximately eye level using the supplied double sided tape. The unit does not contain an internal display light and should be installed so that ambient light is reflected off the display.

The unit shows the amount of oil used in US gallons. To change the units of volume, the DISPLAY button is pressed until the right digit displays an "I" for imperial gallons, "L" for Liters, "H" for total hours of burner motor operation, or "U" for US Gallons (default).

When the oil tank is filled (or to periodically Check oil consumption) the DISPLAY button is pressed once. The unit is activated and will display the volume of oil used or the total hours of burner motor operation, depending on the units selected. Pressing the DISPLAY button toggles the display between US gallons, Imperial Gallons, Liters or Hours.

When oil is received the display should be reset to zero by pressing the UP and DOWN buttons simultaneously. The display will then indicate "0000" US Gallons, Imperial Gallons or Liters, depending on the units previously selected. The hours of operation display is not reset by this procedure and therefore shows the total hours of burner motor operation since the unit was installed. The hours of burner motor operation display can only be reset by removing the battery for 60 seconds or more.

Figure 3:
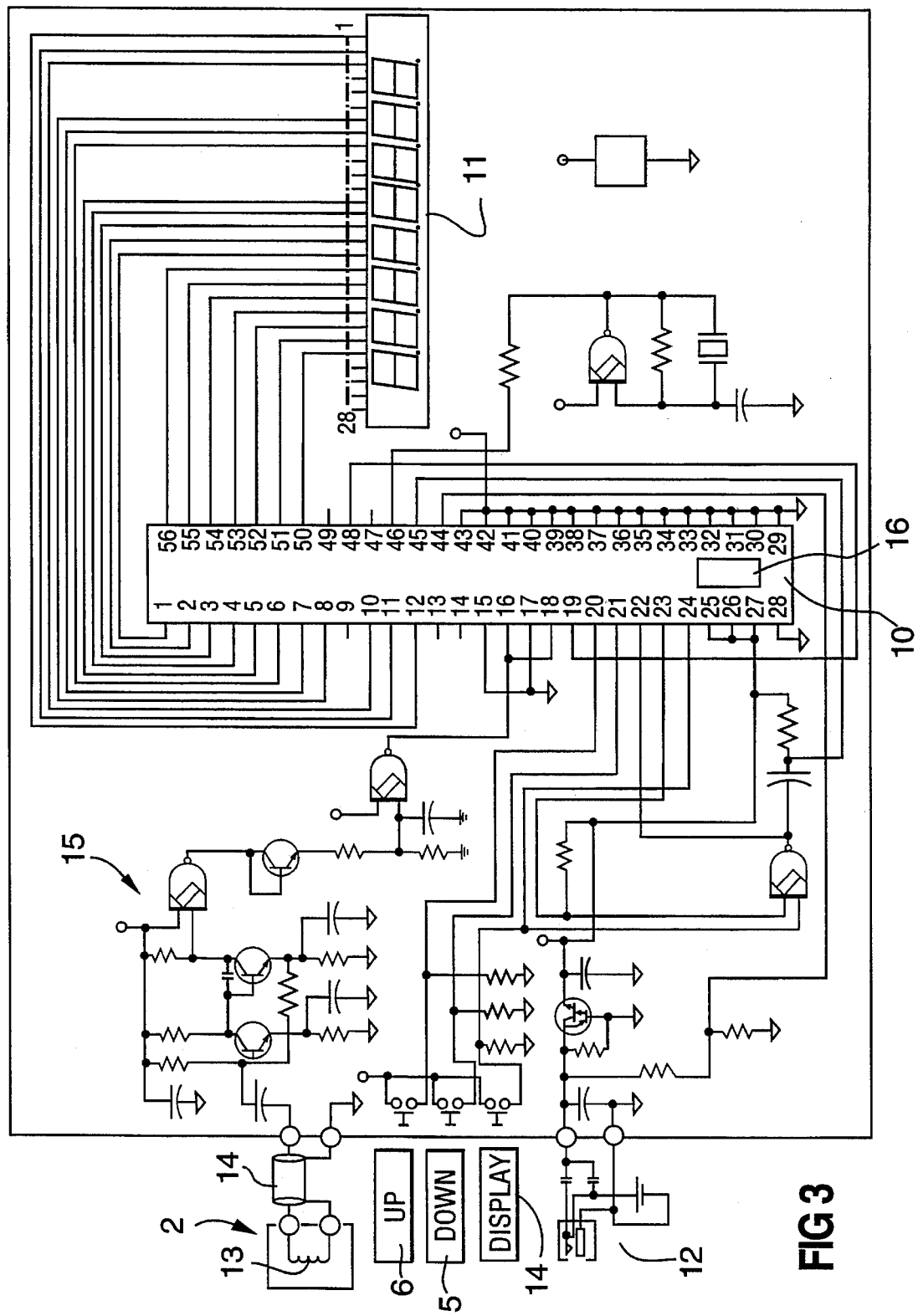
FIG. 3 is a circuit diagram of the oil meter shown in FIG. 1.

FIG. 3 is a block diagram of the device shown in FIG. 2. As will be seen, the device is constructed around a microprocessor 10, which is Motorolla MC68HC705L1 connected to a seven segment LED display 11. The microprocessor 11 includes memory 16 for storing user entered data. The device is powered by a battery 12 connected to a power supply circuit.

Sensor 2 comprises a pick-up coil 13 mounted on the motor housing and therefore in proximity to the motor. Changing magnetic fields caused by operation of the burner motor induce currents in the pick-up coil 13, which are passed to the unit 1 through connecting wire 14, where they are fed to input circuit 15 which generates a DC signal indicating burner motor operation.

The unit 1 and sensor 2 can be conveniently made of lightweight plastic. Both can be installed in a simple manner by the homeowner without the need for any dismantling or invasion of the furnace system.

I claim:

1. In combination, a retrofittable, non-invasive fuel consumption meter and a combustion apparatus having a fuel pump driven by a burner motor incorporating a motor housing, said consumption meter comprising:

a) a sensor externally mounted on said motor housing to sense changing magnetic fields produced by said burner motor during operation thereof to generate a signal indicating burner motor operation;

b) a memory for storing user entered data representing the rate of fuel consumption of said apparatus;

c) a microprocessor connected to said sensor and responsive to said signal and to said stored data in said memory to calculate the accumulated fuel consumption of said apparatus over successive periods of operation; and d) display means for displaying said accumulated fuel consumption as calculated by said microprocessor.

2. The combination as claimed in claim 1, further comprising means for activating said display means in response to a user request to display said calculated oil consumption.

3. The combination as claimed in claim 1, further comprising user-settable means for selecting the units of said display means.

4. The combination as claimed in claim 1, further comprising means for switching said display between reading consumption and time of use of the burner motor.

5. The combination as claimed in claim 1, wherein said sensor is a pick-up coil responsive to said changing magnetic fields produced by said burner motor to create induced currents therein to generate said signal.

6. The combination as claimed in claim 1, wherein said sensor includes an adhesive pad to permit it to be mounted on said burner housing.

7. The combination as claimed in claim 1, wherein said meter is battery operated.

8. A retrofittable, non-invasive fuel consumption meter for an apparatus having a fuel pump driven by a motor having a housing, comprising:

a) a sensor operative to generate a signal indicating operation of a motor without being electrically connected to the motor by detecting changing magnetic fields produced by the motor during operation thereof, said sensor including means for attaching it to the motor housing;

b) a memory for storing user entered data representing the rate of fuel consumption of said apparatus;

c) a microprocessor connected to said sensor and responsive to said signal and to said stored data in said memory to calculate the accumulated fuel consumption of said apparatus over successive periods of operation; and d) display means for displaying said accumulated fuel consumption as calculated by said microprocessor.

9. A meter as claimed in claim 8, wherein said attaching means comprises adhesive pads.

10. A meter as claimed in claim 8, wherein said sensor is a pick-up coil.

11. A meter as claimed in claim 8, which is battery operated.

* * * * *